Sept. 22, 1959     J. F. CERNESS     2,905,511
BEARING

Filed March 28, 1955     2 Sheets-Sheet 1

*INVENTOR.*
JOSEPH F. CERNESS
BY *Eber J. Hyde*
ATTORNEY

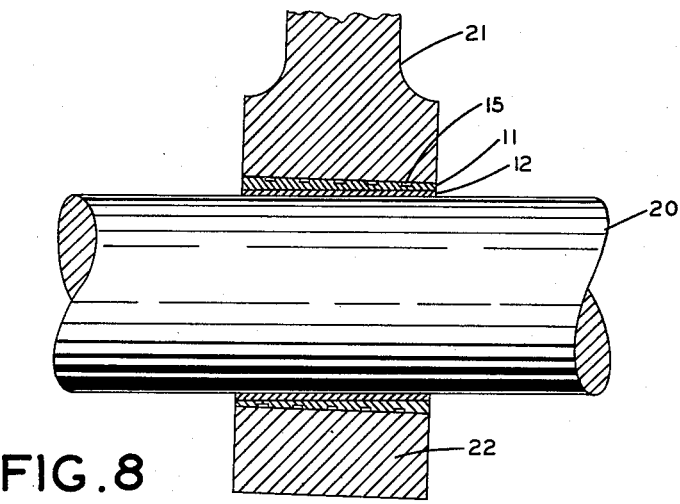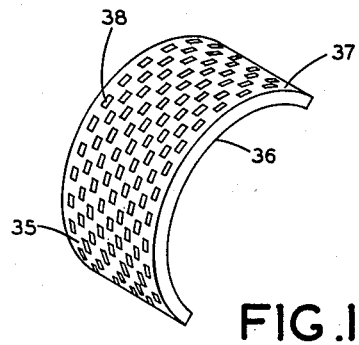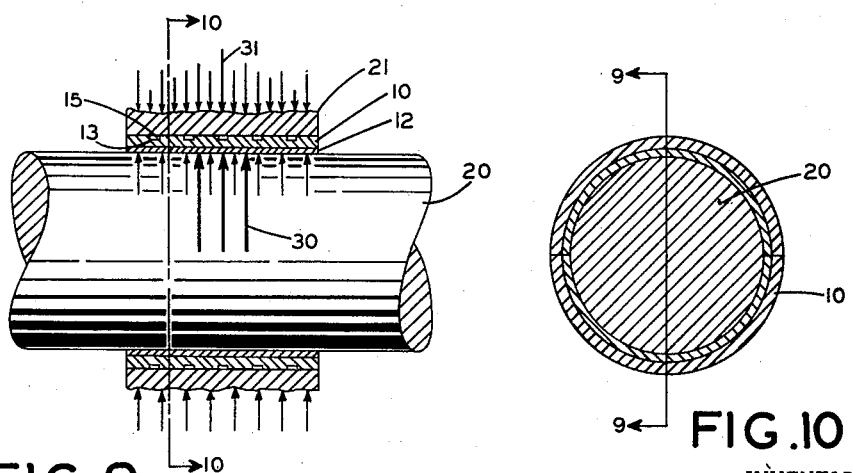

2,905,511

BEARING

Joseph F. Cerness, East Cleveland, Ohio, assignor to Clevite Corporation, Cleveland, Ohio, a corporation of Ohio Application March 28, 1955, Serial No. 497,027

10 Claims. (Cl. 308—237)

This invention pertains to a bearing and more particularly to a sleeve bearing such as is used in internal combustion engines.

The bearing of the present invention differs from prior bearings in that the outer surface of the steel backing lamination has a plurality of indentations, such as grooves or depressions, regularly or irregularly distributed over substantially the entire area as opposed to a conventional smooth back bearing. These indentations increase the elasticity and plasticity of the composite bearing and thereby reduce bearing failure resulting from fatigue and seizure.

It is believed that the bearing of the present invention is superior to previous bearings because if high localized stress occurs at any point between the bearing and the shaft the indented backing member yields along with the bearing member sufficiently to cause the localized stress to dissipate itself over a wider area, resulting in lower unit loading and lower temperature at the high spots of the bearing.

It is an object of the present invention to provide a sleeve type bearing which is less susceptible to failure due to fatigue and seizure.

Another object of the invention is to provide a multilayer sleeve bearing the backing member of which will yield along with the bearing member to cause localized high stresses to dissipate over a wide area resulting in lower unit loading at the high spots of the bearing.

For a better understanding of the present invention, together with other and further objects thereof, reference is had to the following description taken in connection with the accompanying drawings, and its scope will be pointed out in the appended claims.

Figure 8 is a cross-sectional view of a bearing embodying the present invention mounted slightly out of line.

Figure 9 is a side view, partially in section, schematically showing loading between a bearing of this invention and a shaft;

Figure 10 is a sectional view taken along line 10—10 of Fig. 9; and

Figure 11 is an isometric view showing a further modification.

Figure 1:
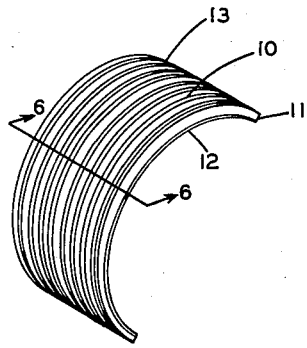
Figure 1 is an isometric view of a sleeve type bearing showing one form of indentations in the back face thereof.

With reference to the two sheets of drawing there is shown in Figure 1 a metal sleeve bearing in the form of a half-shell 10. It is comprised of a relatively strong metal backing lamination 11 formed of low-carbon steel or the like, to which is intimately secured one or more layers of a relatively weak bearing material 12 which forms the inner or concave face of the bearing. As is known in the art the bearing metal 12 engages a rotating crankshaft or the like, and the stronger metal backing lamination 11 is secured in a connecting rod or the like.

Figure 2:
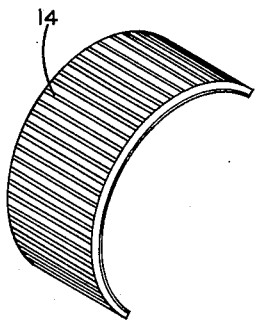
Figures 2 to 5 are isometric views of sleeve bearings showing other types of indentations.
Figure 3:
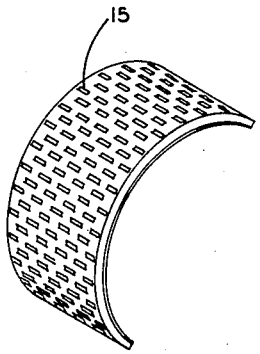
Figure 4:
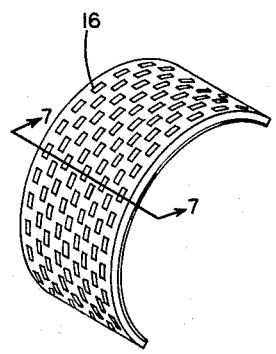
Figure 5:
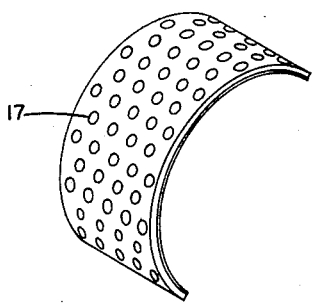
Figure 6:
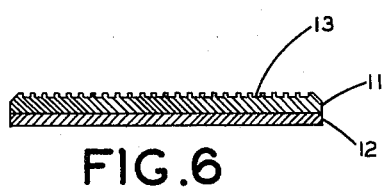
Figure 6 is a cross-sectional view taken along line 6—6 of Fig. 1.
Figure 7:
Figure 7 is a cross-sectional view taken alone line 7—7 of Fig. 4.

The stronger metal backing member 11 has two major faces, the outside, exposed or back face, and the inner face to which is secured the weaker bearing material 12. The back face of the metal backing member has a plurality of indentations shown in the form of arcuate grooves 13 in Figure 1, transverse grooves 14 in Figure 2, transverse rectangular depressions 15 in Figure 3, arcuate rectangular depressions 16 in Figure 4, and circular depressions 17 in Figure 5. These indentations may be regularly distributed or may have random distribution, but should effectively cover the back face of the backing member.

For steel back bearings on the order of about .05 to about .15 inch thick the indentations preferably extend from about one-fifth to about one-third of the way through the metal backing member, and occupy about one-third to two-thirds of the total area of the back face of the bearing member.

For heavy wall bearings in excess of .155 inch thick the indentations preferably extend from about one-tenth to about seven-tenths of the way through the metal backing member, and occupy one to two-thirds of the total area of the back face of the bearing member.

High localized stresses occur when the bearing is slightly out of line, i.e., when the axis of the shaft 20 and the axis of the connecting rod 21 are not exactly 90 degrees to each other. This condition is shown in Figure 8 where the shaft and rod are illustrated out of line to an exaggerated degree. The bearing of the present invention is not nearly as critical of mis-alignment as prior art bearings which had solid backs, and if mis-alignment exists the life of the present bearing is not nearly so severely limited as the life of prior art bearings under mis-aligned conditions.

As is illustrated in Figure 8 the openings 15 in the back surface of the steel lamination 11 permit the steel backing layer to deflect under mis-aligned conditions and adapt itself, within certain limits, to its enforced position.

Figures 9 and 10 schematically illustrate how the bearing of the present invention prevents overloading when a distorted bore exists. The raised portions of the steel back 11 on either side of the indentations 15 tend to deform slightly into the indentations, thereby relieving the high localized stress and causing a larger area of the bearing to accept the load. Also, the bearing halves will engage the shaft 20 with proper clearance entirely around its circumference, in contrast to an ordinary bearing. When a localized load of high intensity 30 is applied to the bearing layer 12 it is transmitted into the steel backing layer 11, and due to slight deformation of the areas between the indentations 15 the high stress will spread somewhat in the steel backing member 13 resulting in a lower intensity force 31 between the back of the bearing and the connecting rod 21.

The invention is applicable to all types of sleeve bearings, such as the full and half-shell types, and is applicable to the soft bearing materials such as the lead and tin base babbitts as well as the hard bearing materials such as the leaded bronzes, aluminum and silver. However, extensive tests have shown that the invention provides outstanding improvement in fatigue and seizure characteristics for laminated bearings having steel backs on the order of .040 to .170 inches thick having a hard bearing metal layer on the order of .002 to .030 inch thick. In these sleeve bearings utilizing a hard bearing material fatigue failure is greatly reduced, and failure due to bearing seizure is substantially reduced.

While the invention has been described in connection with composite metal bearings it is also applicable to non-composite bearings, such for example as that shown in Figure 11 wherein an aluminum or bronze sleeve bearing 35 is shown. The bearing 35 has two major faces 36, 37 one of which 36 is adapted to be in bearing contact with a relatively moving member and the other of which 37 has a plurality of indentations 38. Any other recognized bearing material may be used to form this non-composite bearing.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A unitary metal insert sleeve bearing adapted to be mounted around a rotating shaft and within a bearing housing comprising: a solid shell of metal impervious to lubricating fluids under pressure and having an inner face of bearing material to engage said rotating shaft and an outer face having a plurality of indentations distributed over an area substantially coextensive with said inner face, said indentations dividing said outer face into two areas the first of which is raised relative to the second, said raised first area being in substantially total contact with said bearing housing and the second area being spaced from said bearing housing whereby said bearing when in use has greater elastic yield than a bearing without said indentations and consequently is less apt to seize on said shaft, said greater elastic yield being due solely to the said indentations in said outer face, and said shell of metal between said second area and said inner face being solid.

2. A bearing as set forth in claim 1, further characterized in that said solid shell is comprised of a plurality of layers of metal.

3. A bearing as set forth in claim 2, further characterized by one of said layers being a steel backing layer, said backing layer having said indentations.

4. A bearing as set forth in claim 1, further characterized by said solid shell being formed of aluminum.

5. A bearing as set forth in claim 1, further characterized by said indentations being in the form of grooves.

6. A bearing as set forth in claim 1, further characterized by said indentations being in the form of discontinuous depressions.

7. A bearing as set forth in claim 1, further characterized by said indentations being regularly distributed in said back face.

8. A bearing as set forth in claim 3, further characterized by said steel backing layer being from .040 to .170 inch thick.

9. A bearing as set forth in claim 8, further characterized by said indentations occupying between one-third and two-thirds of the said area which is substantially coextensive with said inner face.

10. A bearing as set forth in claim 9 further characterized by said indentations penetrating said shell by an amount at least 10% and not more than 70% of the thickness of said shell.

References Cited in the file of this patent

UNITED STATES PATENTS

| | | |
|---|---|---|
| 421,089 | Wood | Feb. 11, 1890 |
| 1,941,788 | Crawford | Jan. 2, 1934 |
| 1,957,111 | Short | May 1, 1934 |
| 2,106,860 | Tibbetts | Feb. 1, 1938 |
| 2,333,227 | Bagley | Nov. 2, 1943 |
| 2,574,318 | Burkhardt | Nov. 6, 1951 |
| 2,576,141 | Pike | Nov. 27, 1951 |